United States Patent [19]

Abramczyk

[11] Patent Number: 5,026,092
[45] Date of Patent: Jun. 25, 1991

[54] ENERGY ABSORBING STEERING COLUMN ASSEMBLY HAVING A PASSIVE RESTRAINT LOAD LIMITING SUPPORT SYSTEM

[75] Inventor: William M. Abramczyk, Rochester Hills, Mich.

[73] Assignee: Ford Motor Company, Dearborn, Mich.

[21] Appl. No.: 437,411

[22] Filed: Nov. 15, 1989

[51] Int. Cl.$^5$ .............................................. B62D 1/18
[52] U.S. Cl. ........................................ 280/777; 74/492
[58] Field of Search ................... 280/777, 779; 74/492, 74/493; 188/371; 180/78, 79

[56] References Cited

U.S. PATENT DOCUMENTS

| | | | |
|---|---|---|---|
| 3,505,897 | 4/1970 | Scheffler et al. | 74/492 |
| 3,521,724 | 7/1970 | Mayer | 180/91 |
| 3,740,068 | 6/1973 | Arata | 280/777 |
| 3,785,671 | 1/1974 | Salewsky | 280/87 R |
| 3,803,938 | 4/1974 | Bratke et al. | 74/492 |
| 3,813,960 | 6/1974 | Windett et al. | 74/492 |
| 3,923,319 | 12/1975 | Nonaka et al. | 280/87 R |
| 3,944,244 | 3/1976 | Albrecht | 280/777 |
| 4,102,217 | 7/1978 | Yamamoto et al. | 74/492 |
| 4,194,411 | 3/1980 | Manabe et al. | 74/492 |
| 4,228,695 | 10/1980 | Trevission et al. | 74/492 |
| 4,274,299 | 6/1981 | Jones | 74/492 |
| 4,616,522 | 10/1986 | White et al. | 74/492 |
| 4,627,306 | 12/1986 | Berenjian | 74/492 |
| 4,867,003 | 9/1989 | Beauch et al. | 280/777 |

*Primary Examiner*—Richard A. Bertsch
*Attorney, Agent, or Firm*—Robert F. Hess; Daniel M. Stock; Keith L. Zerschling

[57] ABSTRACT

A passive restraint load limiting steering column support assembly for a motor vehicle which, in effect, provides a fuse in the primary collapsible steering column assembly for allowing the system to accept impact loads greater than the design impact load and those which impact the system in a direction other than that for which it was designed. The system includes a collapsible energy absorbing steering column assembly having upper and lower column tubes telescopically engaged within one another, the steering shaft rotatably suspended within the upper and lower column tubes and the steering wheel secured to the rearward end of the steering shaft. A primary energy absorbing system is affixed to the steering column assembly and secures it to a steering column support member, with the primary energy absorbing system allowing the upper column tube to collapse upon the lower column tube over a predetermined distance in a controlled manner to absorb an impact load of a first predetermined magnitude. The steering column support member further includes a plurality of symmetrically disposed stress risers providing a controlled complete break or fracture across the support member, preferably in a direction generally transverse of the axis of the upper column tube, upon receiving an impact load of a second predetermined magnitude substantially greater than that necessary to implement the primary energy absorbing system, thus freeing the steering column assembly and bringing into effect a normally passive secondary energy absorbing system.

14 Claims, 3 Drawing Sheets

ENERGY ABSORBING STEERING COLUMN ASSEMBLY HAVING A PASSIVE RESTRAINT LOAD LIMITING SUPPORT SYSTEM

TECHNICAL FIELD

This invention relates to an energy absorbing steering column structure principally for use with a motor vehicle.

BACKGROUND OF THE INVENTION

Energy absorbing steering column assemblies are well known in the art. Typically, such assemblies include a telescopically sectional steering column having an upper column section telescopically received about a lower column section and with there being provided an energy absorbing structure within the steering column sections, or fixed to the steering column section and supporting it to a main support bracket affixed to the vehicle body. Typical such arrangements are shown in U.S. Pat. Nos. 3,923,319, 4,102,217, 4,194,411 and 4,616,522. Additional systems are shown in U.S. Pat. Nos. 3,813,960; 4,627,306 and 4,774,299, all of which are assigned to the assignee of the present invention.

Also, it is well known in the art to provide an energy absorbing steering column assembly of the type wherein the main support bracket for the steering column is plastically deformable on being subjected to an impact load of a predetermined magnitude. Generally, amongst these disclosures, impact loads with two or more degrees of freedom or direction of travel of the steering column assembly can be absorbed through the infrastructure of the main support bracket. Typical of such disclosures are those shown in U.S. Pat. Nos. 3,785,671, 3,505,897, 3,521,724, 3,803,938 and 4,228,695.

None of the prior art devices, however, recognize the need for or provide a passive restraint load limiting column support system adapted to come into play only when the primary energy absorbing system, whatever it may be, fails to provide the energy absorbing controlled collapse of the steering column assembly as designed, or one which is adapted to come into play only upon receiving impact loads of greater magnitude than those for which the system was designed.

SUMMARY OF THE INVENTION

The present invention contemplates a passive restraint load limiting steering column support assembly for a motor vehicle which, in effect, provides a fuse in the primary collapsible steering column assembly for allowing the system to accept impact loads greater than the design impact load and those which impact the system in a direction other than that for which it was designed.

The invention further contemplates a steering column support assembly which is designed to fracture upon receiving an impact load of greater magnitude than that which can be accommodated by any primary energy absorbing system designed into the vehicle.

Further, the invention contemplates a steering column assembly restraint system which, under normal conditions, will not be put to use, and one which if put to use, will provide a second energy absorbing system utilizing the plastically deformable nature of the vehicle instrument panel and support structure therefore.

According to a preferred embodiment of the invention, the passive restraint load limiting steering column support system would have the following principal features:

(a) a collapsible energy absorbing steering column assembly comprising an upper column tube and a lower column tube telescopically engaged within one another, the steering shaft rotatably suspended within the upper and lower column tubes and the steering wheel secured to the rearward end of the steering shaft;

(b) a primary energy absorbing system affixed to the steering column assembly and securing it to a steering column support member, with the primary energy absorbing system allowing the upper column tube to collapse upon the lower column tube over a predetermined distance in a controlled manner to absorb an impact load of a first predetermined magnitude; and (c) the steering column support member including a plurality of symmetrically disposed stress risers providing a controlled complete break or fracture across the support member in a direction generally transverse of the axis of the upper column tube upon receiving an impact load of a second predetermined magnitude substantially greater than that necessary to implement the primary energy absorbing system.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
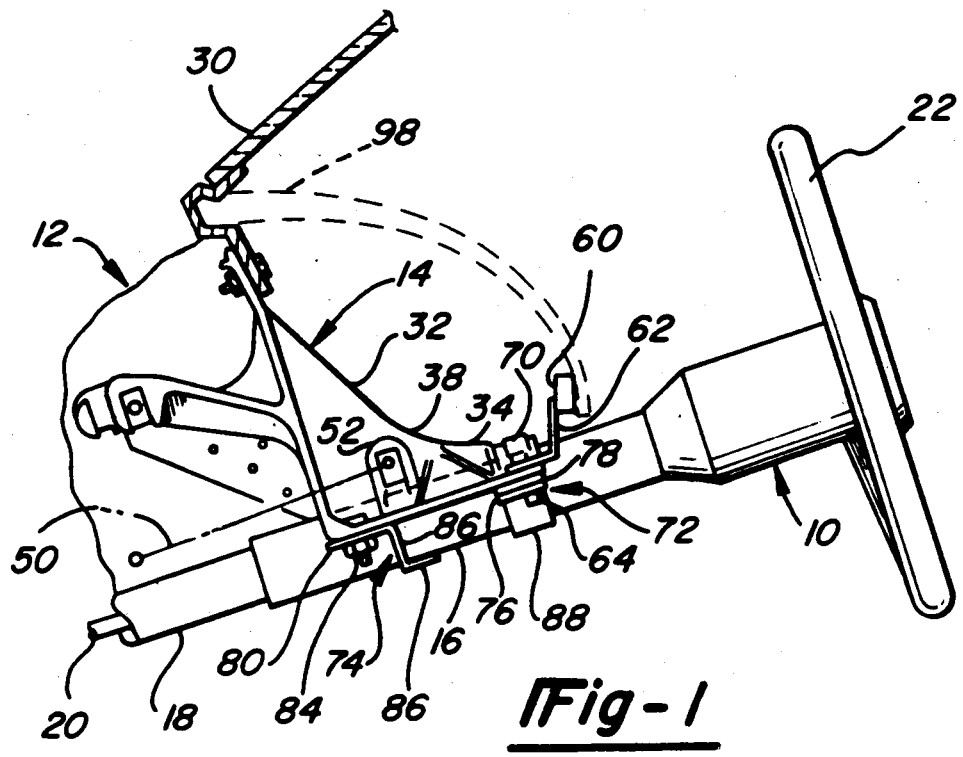
FIG. 1 is a side elevational view of a steering column assembly in combination with the steering column support system as arranged within a motor vehicle and in accordance with the present invention.

In FIG. 1 there is shown a collapsible energy absorbing steering column assembly generally designated 10 secured to a vehicle body generally designated 12 by a steering column support member generally designated as 14.

The steering column assembly itself comprises an upper column tube 16 telescopically arranged about a lower column tube 18. A steering shaft 20 is rotatably suspended within the upper and lower column tubes and connected at its rearward end to a steering wheel 22. Steering column assembly is normally held fixed relative to the vehicle body 12 by the column support member 14.

Figure 2:
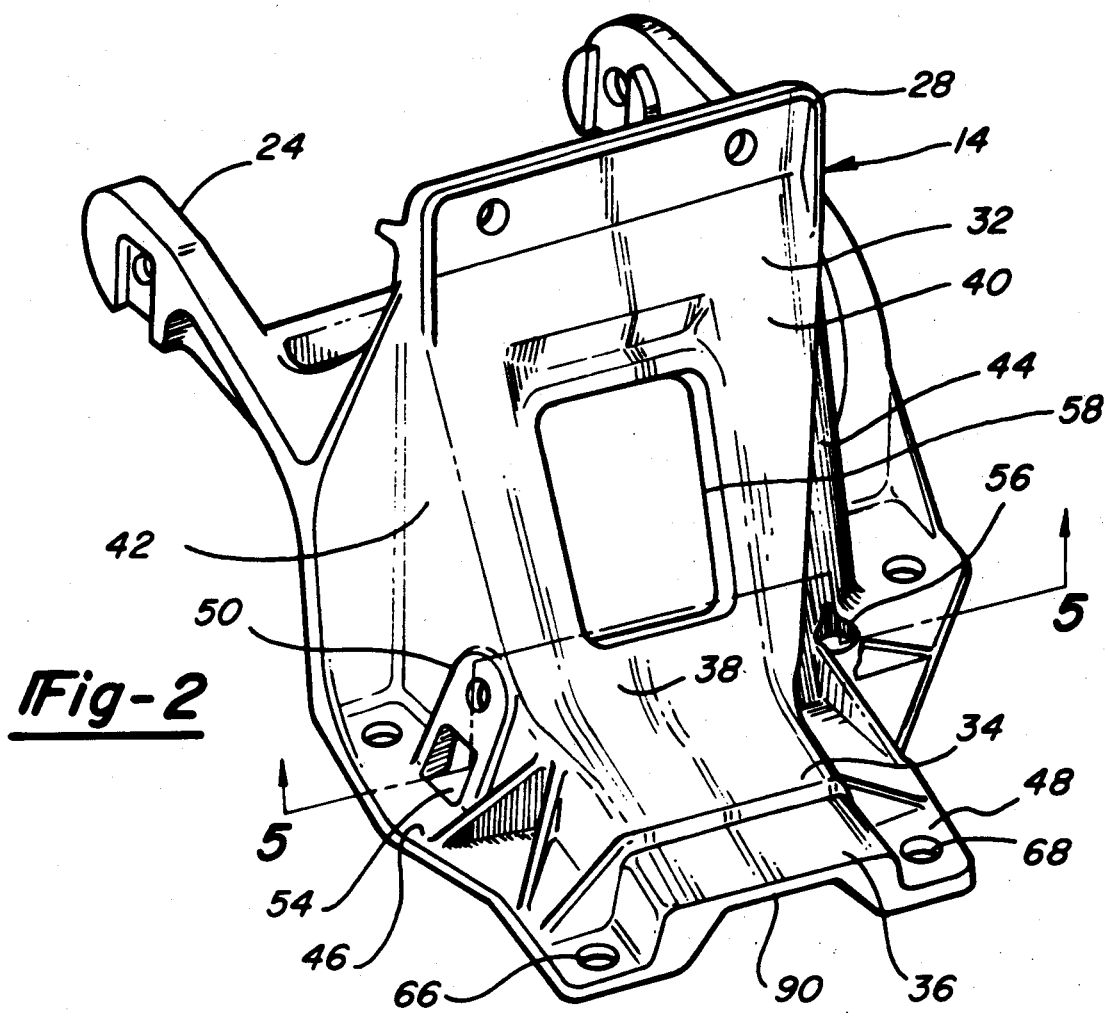
FIG. 2 is a perspective view of the steering column support bracket in accordance with the present invention.

Looking at FIGS. 1 and 2, the column support member is seen to include a pair of main support arms 24 and 26 providing the primary support of the support member to the vehicle body. The support member further includes an upper support flange 28 connecting the column support member to that portion of the vehicle body nearest windshield 30.

The column support member 14 has a basic cross-sectional configuration, as taken in a plane transverse to the axis of steering shaft 20 of an inverted U-shape. It includes a front wall 32 disposed at an acute angle to the axis of steering shaft 20 and a rearward nose portion 34 having at its rearward end a lower support flange 36. The nose portion 34 is basically almost horizontal with the axis of the steering shaft, certainly at a much reduced acute angle to the axis of the steering shaft. This provides a moderate bend point 38 at the juncture of the nose portion 34 with the primary portion 40 of the front wall 32.

Column support member 14 includes two side walls 42 and 44 depending downwardly from the front wall. At the bottom edge of each side wall, there is a respective horizontally disposed steering column attachment flange 46 and 48. Numerous reinforcing ribs are provided as needed between the side walls 42,44 and respective attachment flange 46,48. On one side wall 42, there is provided a reinforcing brace 50 extending from one side of the vehicle body and being secured to side wall 42 at a boss 52. The reinforcing brace 50 is shown schematically in FIG. 1. It will be noted that the boss 52 includes a rectangular shaped opening 54. This is provided to allow insertion of a U-shaped spring clip having affixed to it a threaded nut member useful in attaching the reinforcing brace 50 to the side wall.

As seen in FIG. 2, symmetrically disposed on the opposite side wall 44 and relative to the opening or cavity 54 is a second hole or cavity 56. Further, it will be noted that front wall 32 includes an enlarged rectangular opening 58 symmetrically disposed at its mid-section. The purpose of the opening is primarily to provide a wiring chase whereby the instrument panel wires can be run down behind the instrument panel to the dashboard panel (not shown). The combination of cavities 54, 56 and 58 provide a controlled failure mode for the support member allowing it to function as a passive restraint load limiting member in a manner explained more fully below.

As seen further in FIG. 1, there is provided an instrument panel support member 60 attached to the steering column support member at the lower support flange 36 by means of a connecting bracket 62 which is bolted to the lower support flange by threaded fastener 64 extending through bolt holes 66 and 68. Only one bracket 62 is shown, there being two as indicated in FIG. 2. Each bracket 62 is preferably part of a single bracket which includes a cross-over strap 70 extending from one bolt hole 66 to the other 68.

Connecting the upper column tube to the column support member 14 is a primary energy absorbing system comprising a shear clip module generally designated as 72 and an energy absorbing plastically deformable bend strap generally designated as 74. Typical of the shear clip module designs acceptable for the present invention is that as shown in U.S. Pat. Nos. 3,813,960 and 4,774,299, the disclosure of which is incorporated herein by reference. Likewise, typical of the bend strap constructions suitable for the present invention is that as shown in U.S. Pat. No. 4,627,306, the disclosure of which is incorporated herein by reference. As mentioned earlier, both patents are assigned to the assignee of the present invention.

Generally, the shear clip module 72 includes a mounting flange 76 affixed to one side of the upper steering column 16 and a plastic shear clip 78 interposed between the mounting flange 76 and the attachment flange 46 of the column support member. The same bolt 64 that secures the instrument panel support member bracket 62 to the column support member extends through the mounting block and is affixed to the mounting flange 76 in any suitable manner. The same mounting flange and shear clip assembly is arranged on the opposite side of the column support member.

The bend strap 74 includes a horizontally disposed mounting pad 80 and a vertically disposed energy absorbing portion 82 depending vertically therefrom and affixed at its opposite end to the upper column tube 16. A bolt 84 passes through attachment flange 46 at bolt hole 66 as seen in FIG. 2, and extends through the opposite side of the mounting pad thus allowing the upper column tube to be securely fixed relative to column support member 14. The same bend strap clamping arrangement is arranged on the opposite side of the upper column tube. Preferably, both the bend straps 74 and the shear clip modules mounting flanges 72 can be constructed as respective integral U-shape members having a respective central portion 86,88 thereof wrapped around and fixed to the lower portion of the upper column tube 16 to hold the steering column assembly securely within the column support member 16.

It will be noted that the top portion of the upper column tube 16 is caused by the shear clip mounting flanges 76 to be clamped securely against the undersurface 90 of lower support flange 36. This is the only point along the column support member at which the upper column tube makes contact with the column support member.

Preferably, the column support member is constructed as an aluminum alloy casting having general characteristics of relatively high brittleness, notch sensitivity and strength, and little yield. These characteristics provide a casting having the required strength to function as normally intended, yet one which tolerates little or no plastic deformation. Thus, should the casting receive an impact of predetermined magnitude, the casting will lend itself to fracturing completely and quickly across whatever predetermined failure path may be designed into the system, as explained more fully below. Obviously, other materials having these same characteristics could be substituted.

Figure 3:
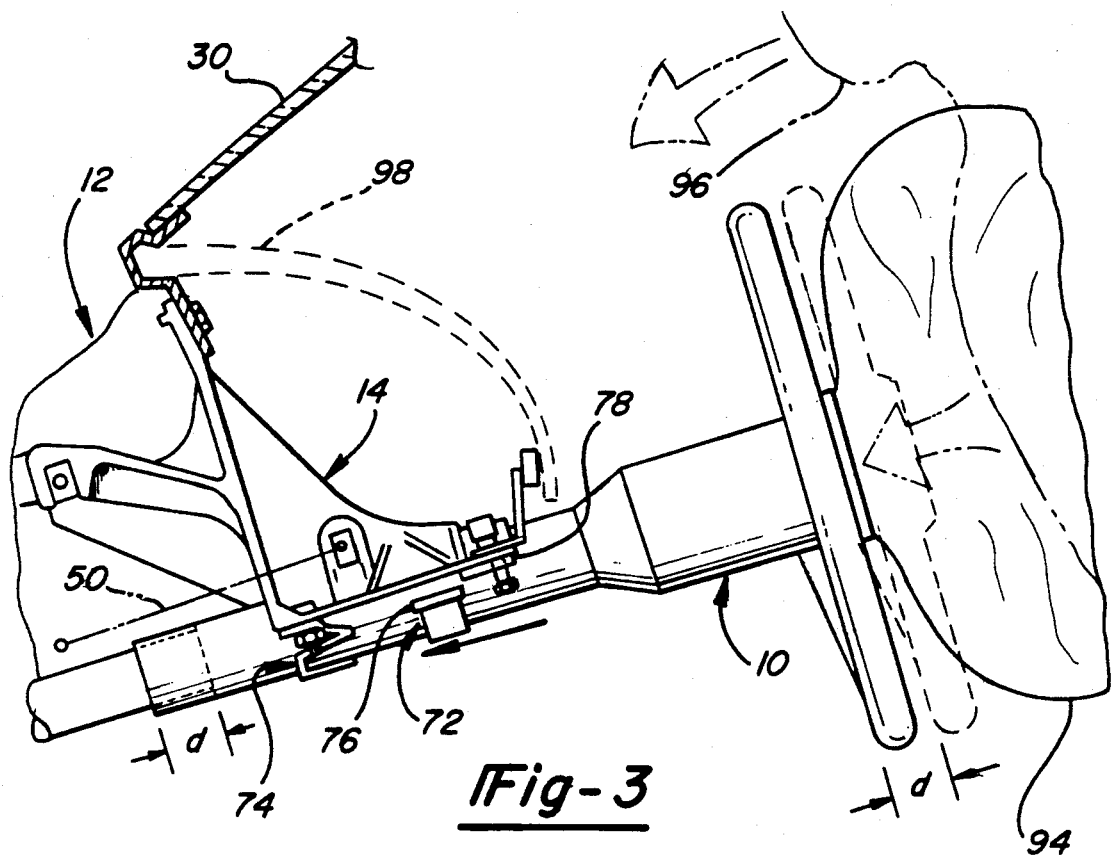
FIG. 3 is a side elevation view of the steering column assembly showing implementation of the primary energy absorbing system.
Figure 4:
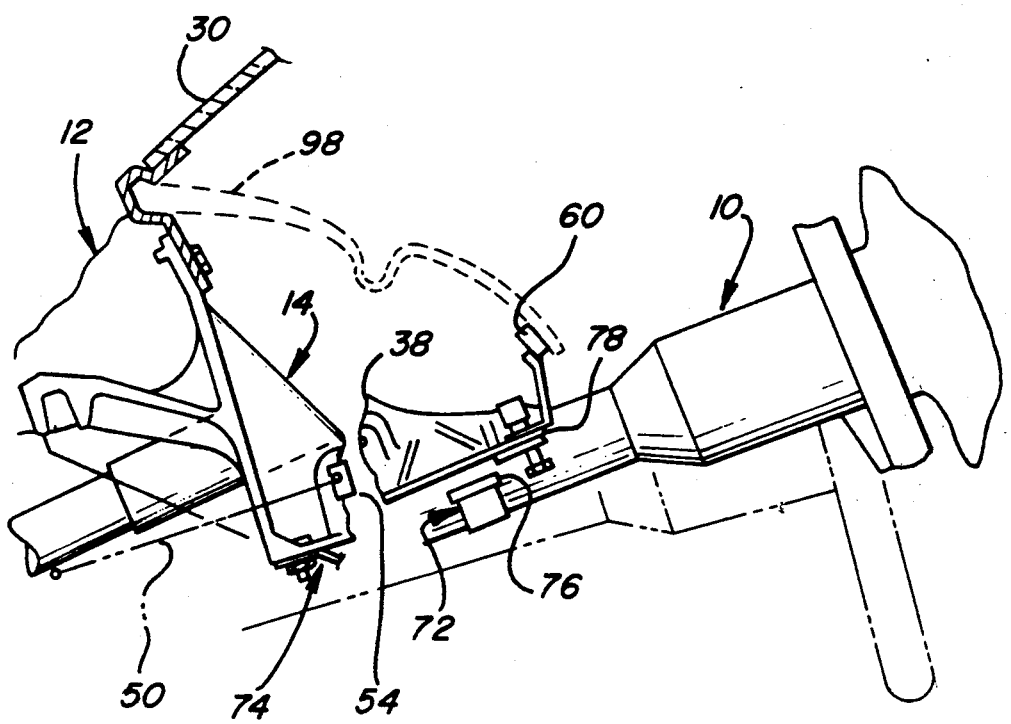
FIG. 4 is a side elevational view of the steering column assembly as illustrated in FIG. 3 and showing implementation of the present invention in the most advanced stage of a severe impact collision.

The operation of the present invention is shown most clearly in FIGS. 3 and 4.

FIG. 3 illustrates the normal collapse sequence of the present invention Preferably, the system is used in conjunction with an air bag restraint system. The air bag 94 is designed to expand between the steering wheel 22 and an occupant 96 following vehicle impact of a certain predetermined magnitude.

Normally, the sequence of operation would include the following. First, an impact of a predetermined magnitude causes the air bag to inflate between driver and steering wheel. If the impact load is significantly more than the predetermined magnitude, the steering wheel assembly will axially collapse up to a maximum distance generally designated as "d" which, for most commercial vehicles today, is approximately $1\frac{1}{2}$ to 2 inches travel. Before the steering wheel can axially collapse at all, an impact load of a second predetermined magnitude greater than the first must be reached sufficient to shear the mounting block 78 free of the shear clip mounting flange 76. Assuming the impact load on the steering wheel equals or exceeds this second predetermined magnitude, further axial collapse of the upper column tube 16 upon the lower column tube 18 will depend on the amount of energy which the bend strap 74 can absorb through plastic deformation. This predetermined magnitude is designed into the system in accordance with the best judgment of the designer. Certain minimum standards may be prescribed, and are in fact prescribed by the U.S. Department of Transportation.

Figure 5:
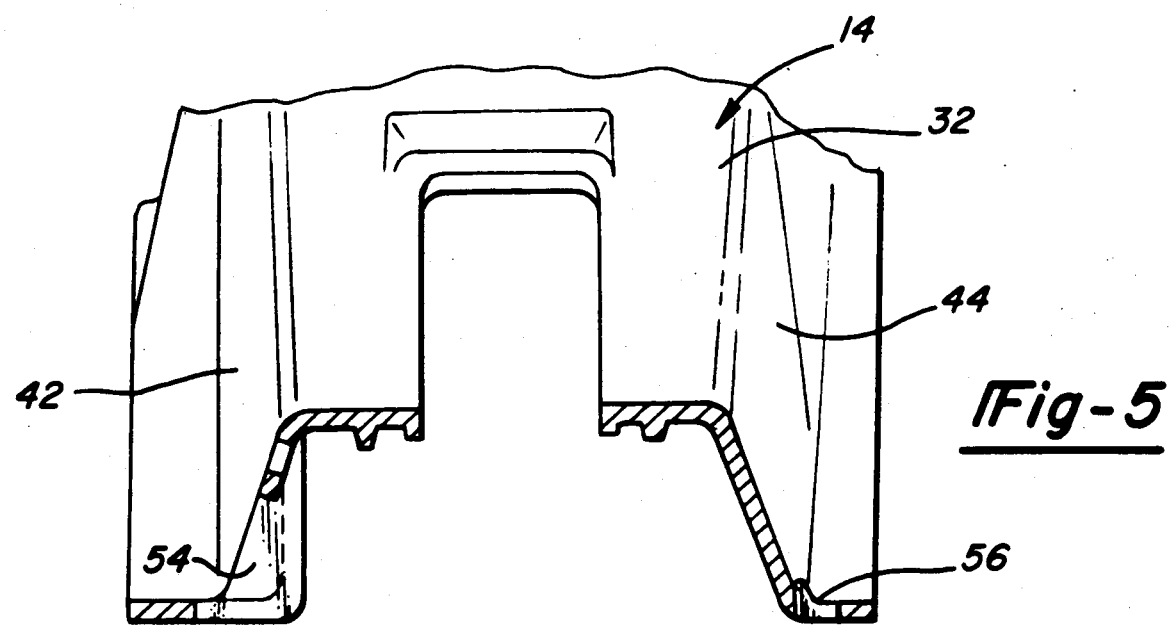
FIG. 5 is a cross-sectional view taken along the lines 5—5 of FIG. 2.

Under all normal circumstances, the failure mode of the operational sequence of the collapsible energy absorbing steering column assembly will be as described above. Fortunately, there seldom arises a need for any greater or supplemental restraint system. However, in certain instances, due to the severity of a collision, or perhaps due to an unusual impact loading condition being placed on the steering column assembly, a passive restraint load limiting system as may be coupled with a secondary energy absorbing system may prove helpful. Thus, the column support bracket 14 is designed in a manner described earlier to fracture in a controlled mode across a fracture plane defined by the alignment of cavities 54, 56 and 58. Each of these cavities acts as a stress riser and assures that the upwardly directed vector force of any impact load greater than that for which the system is designed will cause cracks to propagate first at the cavities 54 and 56 and then to proceed across the front wall to the stress riser formed by cavity 58. The fact that the nose portion meets the major portion of the front wall at bend 38 also enhances the cleanness of the fracture along this plane, as seen in FIG. 5.

The result, as best seen in FIG. 4, is that the steering column assembly is thereby free to move upwardly in a second degree of freedom. This has two advantages. First, the actual impact load to which an occupant may be subjected is maintained at a level no greater than that at which the steering column support member fractures. Secondly, the fracture allows a further degree of movement of the entire assembly including the air bag and brings the air bag into contact with other restraining portions of the vehicle body such as windshield 30 that much quicker, thereby resuming the controlled collapse of the system and deceleration of the occupant. Third, upon upward movement of the column support member and steering column assembly, the entire steering column assembly will begin to exert a load upon instrument panel support member 60 and cause its plastic deformation and that of the instrument panel 98 itself. This provides a further cushioning or energy absorbing system for the entire assembly.

Thus, the present invention provides a passive restraint load limiting system whereby the column support bracket will collapse or break (as a sheet of glass) on the impact load reaching a predetermined design limit. Upon breaking, this then allows the steering column assembly to travel beyond the axial extent normally permitted by the primary design system—mainly the primary energy absorbing system 72,74—such that second energy absorbing systems come into play. The secondary systems include the energy absorbing characteristics of the instrument panel upper support rail and the instrument panel itself, as well as that provided by the impingement of the air bag against the windshield. The result is that the maximum impact load is maintained or controlled to be that of the break point of the column support member and there is provided additional time within which to absorb the energy of the occupant's forward movement.

Under the best of conditions, the passive restraint load limiting system of the present invention will not come into play at all. In other words, it will not be used. It allows for example, one to effectively design the collapsible energy absorbing steering column system for the 30 mile per hour impact conditions as prescribed by federal regulations. It further provides for the contingency of providing the occupant an additional safety factor when the design system is subjected to substantially more severe conditions.

While the best mode for carrying out the invention has been described in detail, those familiar with the art with which this invention relates will recognize various alternative designs and embodiments for carrying out the invention as defined by the following claims.

For example, one such alternative is to provide column support member 14 with a failure mode fracturing in a plane extending vertically through the axis of the steering column assembly. This could be accomplished by incorporating stress risers from front to rear of the nose portion 34 allowing it to fail longitudinally rather than transversely. Other alternatives will likewise be apparent to those familiar with the art.

What is claimed is:

1. In combination for a motor vehicle, a collapsible energy absorbing steering column assembly and a passive restraint load limiting support system;

said collapsible energy absorbing steering column assembly comprising:

an upper column tube;

a lower column tube telescopically engaged with said upper column tube;

a steering shaft rotatably suspended within said telescopically engaged upper and lower column tubes;

a steering wheel secured to the rearward end of said steering shaft;

support means for mounting said upper column tube within a vehicle body;

first means fixed to said upper column tube for mounting said upper column tube to said support means and for restraining said upper column tube from moving axially relative to said lower column tube until sustaining an impact load of a first predetermined magnitude;

second means fixed to said upper column tube for mounting said upper column tube to said support means and for absorbing impact loads through plastic deformation as said column tubes move axially relative to one another over a predetermined distance following release by said first means;

said passive restraint load limiting support system comprising said support means being disposed in a manner straddling said upper column tube and normally restraining movement of said upper column tube in a direction vertically transverse of the axis thereof; and said support means including means for providing a controlled break across the support means in a direction generally transverse of the axis of said upper column tube upon receiving a vertical impact load of a second predetermined magnitude substantially greater than said first predetermined magnitude, whereby said steering column assembly may swing upwardly in the direction of the vehicle windshield thereby relieving the occupant of incurring a greater resultant impact load.

2. In combination for a motor vehicle, a collapsible energy absorbing steering column assembly and a passive restraint load limiting support member, said steering column assembly including an upper column tube and a lower column tube telescopically engaged with one another, a steering shaft rotatably suspended within said upper and lower column tubes, and a steering wheel secured to the rearward end of said steering shaft;

primary energy absorbing means affixed to said steering column assembly for absorbing through deformation impact loads of a first predetermined magnitude transferred from said steering wheel as said upper and lower column tubes collapse axially relative to one another over a predetermined distance and in a controlled manner;

said support member including failure mode means for providing a controlled break across the support member in a direction generally transverse the axis of said upper column tube upon receiving a vertical impact load of predetermined magnitude substantially greater than said first predetermined magnitude, whereby said steering column assembly may swing upwardly in the direction of the vehicle windshield thereby relieving the occupant of incurring a greater resultant impact load.

3. The invention as described in claim 2 wherein said support member has a cross-sectional generally U-shaped configuration as viewed in a plane transverse to the longitudinal axis of said steering column and comprising a front wall and two oppositely disposed side walls depending downwardly from said front wall;

at least a portion of said front wall adapted to be disposed immediately above and in close proximity to said steering column;

said failure mode means providing a complete fracture of said front wall along a predetermined path upon receiving the vertical impact load of predetermined magnitude from said steering column.

4. The invention as described in claim 3 wherein said primary energy absorbing means includes a first means for mounting said upper column tube to said support member and for restraining said upper column tube from moving axially relative to said lower column tube until sustaining an impact load of said first predetermined magnitude.

5. The invention as described in claim 4 wherein said primary energy absorbing means further includes a second means for mounting said upper column tube to said support member and for absorbing impact loads through plastic deformation as said column tubes move axially relative to one another over a predetermined distance following release by said first means.

6. The invention as described in claim 4 wherein said failure mode means includes a stress relief cavity formed in each said side wall in substantially identical locations at each said side wall and in a plane substantially transverse to the longitudinal axis of said steering column, said support member front wall including a nose portion at the rearward end thereof nearest said steering wheel, said failure mode means fracturing said front wall in such manner as to release said nose portion from the remainder of said support member, thereby allowing the entire said steering column assembly to be displaced vertically upwardly.

7. The invention as described in claim 6 further including a secondary energy absorbing system for arresting the vertical displacement of said steering column assembly;

said secondary energy absorbing system being affixed to said nose portion and adapted to absorb the impact load of said steering column assembly in a predetermined manner substantially immediately upon fracture of said nose portion;

said secondary energy absorbing system including a tubular instrument panel lower support member arranged transversely of the longitudinal axis of said steering column and having both ends adapted to be affixed to said vehicle body, whereby upon impact of said second predetermined magnitude, the entire vehicle instrument panel and support structure therefor will plastically deform to absorb said impact load and yield to permit further movement of the steering column assembly and the vehicle occupant making contact with the steering column assembly.

8. A passive restraint load limiting support assembly for an energy absorbing steering column constructed to be mounted in a motor vehicle body, including:

a support bracket adapted to straddle the top of said steering column;

means securing the steering column to said support bracket;

said support bracket having a cross-sectional generally U-shaped configuration as viewed in a plane transverse to the longitudinal axis of said steering column and comprising a front wall and two oppositely disposed side walls depending downwardly from said front wall;

at least a portion of said front wall adapted to be disposed immediately above and in contact with said steering column;

said support bracket including failure mode means for providing a complete fracture of said front wall from one side wall to the other said side wall along a predetermined path upon receiving an impact load of a predetermined magnitude from said steering column.

9. The invention as described in claim 8 wherein said failure mode means includes a stress relief cavity formed in each side wall in substantially identical locations at each side wall and in a plane substantially transverse to the longitudinal axis of said steering column.

10. The invention as described in claim 9 wherein said failure mode means constitutes a hole extending through the entire cross-sectional thickness of said support bracket.

11. The invention as described in claim 10 wherein said front wall includes a nose portion at the rearward end thereof adapted to be nearest a steering wheel, said failure mode means fracturing said front wall in such manner as to release said nose portion from the remainder of said support bracket, thereby allowing the entire said steering column to be displaced vertically upwardly.

12. The invention as described in claim 11, further including a secondary energy absorbing system for arresting the vertical displacement of said steering column assembly, said secondary energy absorbing system being affixed to said nose portion and adapted to absorb the impact load of said steering column in a predetermined manner substantially immediately upon fracture of said nose portion.

13. The invention as described in claim 12 wherein said secondary energy absorbing system includes a tubular instrument panel lower support member arranged transversely of the longitudinal axis of said steering column and having both ends adapted to be affixed to said vehicle body, whereby upon impact of said second predetermined magnitude, the entire vehicle instrument panel and support structure therefor will plastically deform to absorb said impact load and yield to permit further movement of the steering column assembly and the vehicle occupant making contact with the steering column assembly.

14. The invention as described in claim 8 wherein said front wall includes a nose portion at the rearward end thereof adapted to be nearest a steering wheel, said failure mode means fracturing said front wall in such manner as to release said nose portion from the remainder of said support bracket, thereby allowing the entire said steering column to be displaced vertically upwardly.

* * * * *